(12) United States Patent
Iida et al.

(10) Patent No.: US 11,761,475 B2
(45) Date of Patent: Sep. 19, 2023

(54) HALF BEARING AND SLIDING BEARING

(71) Applicant: DAIDO METAL COMPANY LTD., Nagoya (JP)

(72) Inventors: Daiki Iida, Inuyama (JP); Yasushi Saito, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 17/587,144

(22) Filed: Jan. 28, 2022

(65) Prior Publication Data
US 2022/0260109 A1 Aug. 18, 2022

(30) Foreign Application Priority Data
Feb. 12, 2021 (JP) .................................. 2021-020831

(51) Int. Cl.
| | |
|---|---|
| F16C 9/02 | (2006.01) |
| F16C 17/02 | (2006.01) |
| F16C 33/10 | (2006.01) |
| F16C 9/04 | (2006.01) |
| F16C 33/04 | (2006.01) |

(52) U.S. Cl.
CPC .................. F16C 9/02 (2013.01); F16C 9/04 (2013.01); F16C 17/022 (2013.01);
(Continued)

(58) Field of Classification Search
CPC ...... F16C 9/00; F16C 9/02; F16C 9/04; F16C 17/022; F16C 33/046; F16C 33/1065; F16C 33/107; F16C 33/1075; F16C 2360/22
See application file for complete search history.

(56) References Cited

U.S. PATENT DOCUMENTS

| | | | | |
|---|---|---|---|---|
| 8,979,379 | B1 * | 3/2015 | Kawashima | ........ F16C 33/1065 384/288 |
| 2005/0201647 | A1 * | 9/2005 | Kuroda | ............... F16C 33/1065 384/291 |

(Continued)

FOREIGN PATENT DOCUMENTS

| | | |
|---|---|---|
| DE | 102005011371 A1 | 10/2005 |
| DE | 102010036283 A1 | 4/2011 |

(Continued)

OTHER PUBLICATIONS

Office Action dated Apr. 14, 2023, in corresponding German Application No. 10 2022 103 307.4.

*Primary Examiner* — Alan B Waits
(74) *Attorney, Agent, or Firm* — Harness, Dickey & Pierce, P.L.C.

(57) ABSTRACT

Provided is a half bearing constituting a sliding bearing for a shaft member of an internal combustion engine that is unlikely to cause seizure in a sliding surface even if deflection or whirling of the shaft member occurs during an operation of the internal combustion engine. In a half bearing that constitutes a sliding bearing, a plurality of circumferential-direction grooves are formed to be adjacent to each other in a sliding surface, the sliding surface includes a plane portion that is parallel to an axial line direction and an inclined surface portion that is adjacent to the plane portion, the inclined surface portion is displaced from the plane portion toward an end portion of the sliding surface in the axial line direction such that the sliding surface successively comes close to a back surface, positions of maximum groove depths of the circumferential-direction grooves are located on groove center lines, the groove center lines in the inclined surface portion of the sliding surface are inclined relative to a vertical line toward the end portion of the sliding surface in the axial line direction, a groove inclina- (Continued)

tion angle of the circumferential-direction groove that is the closest to the plane portion is a minimum angle, and the groove inclination angle successively increases toward the end portion of the sliding surface in the axial line direction.

12 Claims, 8 Drawing Sheets

(52) U.S. Cl.
CPC .......... *F16C 33/046* (2013.01); *F16C 33/107* (2013.01); *F16C 33/1065* (2013.01); *F16C 33/1075* (2013.01); *F16C 2360/22* (2013.01)

(56) References Cited

U.S. PATENT DOCUMENTS

| | | | |
|---|---|---|---|
| 2011/0058761 A1* | 3/2011 | Ishigo | F16C 33/046 |
| | | | 384/288 |
| 2013/0251293 A1* | 9/2013 | Ishigo | F16C 33/103 |
| | | | 384/129 |
| 2013/0343682 A1* | 12/2013 | Garnier | F16C 33/1065 |
| | | | 384/322 |
| 2014/0064645 A1* | 3/2014 | Kawashima | F16C 17/022 |
| | | | 384/288 |
| 2015/0055900 A1* | 2/2015 | Kawashima | F16C 33/1065 |
| | | | 384/288 |
| 2016/0230806 A1* | 8/2016 | Kato | F16C 9/02 |
| 2021/0095713 A1* | 4/2021 | Goto | F16C 9/02 |
| 2022/0260110 A1* | 8/2022 | Iida | F16C 3/14 |

FOREIGN PATENT DOCUMENTS

| | | |
|---|---|---|
| DE | 102011077 278 B3 | 10/2012 |
| JP | H07-18051 U | 3/1995 |
| JP | H08-277831 A | 10/1996 |
| JP | 2004-92448 A | 3/2004 |
| JP | 2014-516144 A | 7/2014 |
| WO | WO-2010038588 A1 | 4/2010 |

* cited by examiner (RELATED ART)

HALF BEARING AND SLIDING BEARING

INCORPORATION BY REFERENCE

The present application claims priority from JP Patent Application Ser. No. 2021-20831 filed on Feb. 12, 2021, the content of which is hereby incorporated by reference into this application.

BACKGROUND OF THE INVENTION

(1) Field of the Invention

The present invention relates to a half bearing constituting a sliding bearing that supports a crankshaft or the like of an internal combustion engine. The present invention also relates to a sliding bearing with a cylindrical shape that includes the half bearing and supports a crankshaft or the like of an internal combustion engine.

(2) Description of Related Art

A crankshaft of an internal combustion engine is supported at its journal portion by a cylinder block lower portion of the internal combustion engine via a main bearing constituted by a pair of half bearings. For the main bearing, a lubricant ejected by an oil pump is fed from an oil gallery formed in a cylinder block wall into a lubricant groove formed along an inner circumferential surface of the main bearing through a through-hole formed in a wall of the main bearing. Also, a first lubricant path is formed in a penetrating manner in a diameter direction of the journal portion, and openings at both ends of the first lubricant path communicate with the lubricant groove of the main bearing. Moreover, a second lubricant path passing through a crank arm portion is formed to be branched from the first lubricant path at the journal portion, and the second lubricant path communicates with a third lubricant path formed to penetrate in a diameter direction of a crank pin. In this manner, the lubricant fed from the oil gallery in the cylinder block wall into the lubricant groove formed in the inner circumferential surface of the main bearing through the through-hole passes through the first lubricant path, the second lubricant path, and the third lubricant path and is supplied from an ejection port opened at an end of the third lubricant path to a part between a crank pin and a sliding surface of a conrod bearing constituted by the pair of half bearings (see JP-A-8-277831, for example). The oil is supplied to a part between a surface of the crankshaft and the sliding surface of the conrod bearing.

The bearing constituted by the pair of half bearings is also used for a link mechanism portion of a variable compression ratio device and a balancer mechanism portion of a balancer device of an internal combustion engine (see JP-A-2004-92448 and Japanese Utility Model Laid-Open No. 7-18051, for example).

In the related art, a half bearing including a crowning constituted by an inclined surface at one of or both end portions of a sliding surface in an axial line direction has been proposed to alleviate local and strong collision (contact) of a part near the end portion of the sliding surface of the half bearing in the axial line direction against a shaft member, such as a crankshaft, due to occurrence of deflection or whirling of the shaft member during an operation of an internal combustion engine (see International Publication No. WO 2010/038588 and JP-A-2014-516144, for example).

In recent years, there is a trend that shaft members have lower rigidity due to weight reduction of internal combustion engines, and the amounts of deflection and the amounts of shaking of the shaft members during operations of the internal combustion engine have increased. Therefore, the half bearing including a crowning as proposed in International Publication No. WO 2010/038588 and JP-A-2014-516144 also has a problem that a high temperature is likely to be achieved due to direct contact between the part near the end portion of the sliding surface in the axial line direction and the shaft member and seizure is likely to occur in the sliding surface.

BRIEF SUMMARY OF THE INVENTION

An object of the present invention is to provide a half bearing constituting a sliding bearing for a shaft member of an internal combustion engine that is unlikely to cause seizure in a sliding surface even if deflection or whirling of the shaft member occurs during an operation of the internal combustion engine and the sliding bearing.

In order to solve the aforementioned problem, the present invention provides a half bearing constituting, by a combination of a pair of half bearings, a sliding bearing with a cylindrical shape, in which the half bearing has a semi-cylindrical shape and has a back surface on an outer circumferential surface side and a sliding surface on an inner circumferential surface side, a plurality of circumferential-direction grooves are formed to be adjacent to each other in the sliding surface, the plurality of circumferential-direction grooves being formed over an entire length of the sliding surface in a circumferential direction, the plurality of circumferential-direction grooves being formed over an entire width of the sliding surface, the circumferential-direction grooves including curved recessed surfaces when seen in a section of the half bearing in an axial line direction, apex portions being formed between the recessed surfaces of the adjacent circumferential-direction grooves, a line connecting the apex portions representing the sliding surface, the sliding surface includes a plane portion that is parallel to the axial line direction and an inclined surface portion that is adjacent to the plane portion, the inclined surface portion being located at one of or both end portions of the sliding surface in the axial line direction, the inclined surface portion being displaced from the plane portion toward the end portion of the sliding surface in the axial line direction such that the sliding surface successively comes close to the back surface, and the inclined surface portion is formed over at least a part of the length of the sliding surface in the circumferential direction, in which a groove width of the circumferential-direction grooves is defined as a length of imaginary straight lines linearly connecting the apex portions on both sides of the circumferential-direction grooves, groove center lines are defined as lines that pass through center positions of the lengths of the imaginary straight lines and extend in a normal direction with respect to the imaginary straight lines, a groove depth of the circumferential-direction grooves is defined as a length to positions where the recessed surfaces are most separated from the imaginary straight lines in the normal direction with respect to the imaginary straight lines, the positions of maximum groove depths of the circumferential-direction grooves are located on the groove center lines, areas surrounded by the imaginary straight lines and the recessed surfaces are defined as groove sectional areas, each of the plurality of circumferential-direction grooves has the same groove width, the same groove depth, and the same groove sectional area, and the groove width, the groove depth, and the groove sectional area of the circumferential-direction grooves are the same at any position in the circumferential direction, an angle formed by a vertical line extending in the vertical direction from the plane portion of the sliding surface toward an axial line of the half bearing and the groove center lines is defined as a groove inclination angle θ1, and the groove inclination angle θ1 in the plane portion of the sliding surface is 0°, and the groove center lines in the inclined surface portion of the sliding surface are inclined relative to the vertical line toward the end portion of the sliding surface in the axial line direction, the groove inclination angle θ1 of the circumferential-direction groove that is the closest to the plane portion is a minimum angle, and the groove inclination angle θ1 successively increases toward the end portion of the sliding surface in the axial line direction.

According to another embodiment of the present invention, when the inclined surface portions are located at both end portions in the axial line direction, the inclined surface portions are formed symmetrically with respect to a center of the sliding surface in a width direction.

According to another embodiment of the present invention, a maximum width of the inclined surface portion is a length corresponding to 2 to 10% of a width of the sliding surface.

According to another embodiment of the present invention, at a position where the inclined surface portion has a maximum width, a depth of the inclined surface portion is 2 to 10 μm, and here, the depth of the inclined surface portion is a difference (T−T1) between a wall thickness T of the plane portion and a wall thickness T1 of the inclined surface portion at the end portion of the sliding surface in the axial line direction.

According to another embodiment of the present invention, the inclined surface portion has a maximum width and a maximum depth at a center portion of a length of the half bearing in the circumferential direction, and here, the depth of the inclined surface portion is a difference (T−T1) between a wall thickness T of the plane portion and a wall thickness T1 of the inclined surface portion at the end portion of the sliding surface in the axial line direction, and the width and the depth of the inclined surface portion successively decrease toward both end portions of the length of the half bearing in the circumferential direction.

According to another embodiment of the present invention, the inclined surface portion has a parallel portion with a constant length in the axial line direction at a position including the center portion of the length of the half bearing in the circumferential direction.

In another embodiment of the present invention, the groove depth of the circumferential-direction grooves is 1.5 to 10 μm.

In another embodiment of the present invention, the groove width of the circumferential-direction grooves is 0.05 to 0.25 mm.

In another embodiment of the present invention, the groove inclination angle θ1 of the circumferential-direction groove in the inclined surface portion that is the closest to the end portion of the sliding surface in the axial line direction is $3\times10^{-2\circ}$ to $30\times10^{-2\circ}$ at a position where the inclined surface portion has a maximum width.

In another embodiment of the present invention, the half bearing includes two crash reliefs formed on an inner circumferential surface side to be adjacent to both end portions of a length of the half bearing in the circumferential direction.

According to another aspect of the present invention, there is provided a sliding bearing with a cylindrical shape that supports a shaft member of an internal combustion engine, the sliding bearing including: any of the aforementioned half bearings.

Also, according to another embodiment of the present invention, the sliding bearing is constituted by combining a pair of the half bearings.

DETAILED DESCRIPTION OF THE INVENTION

Hereinafter, specific examples of the invention of the present application will be described with reference to the drawings.

Figure 1:
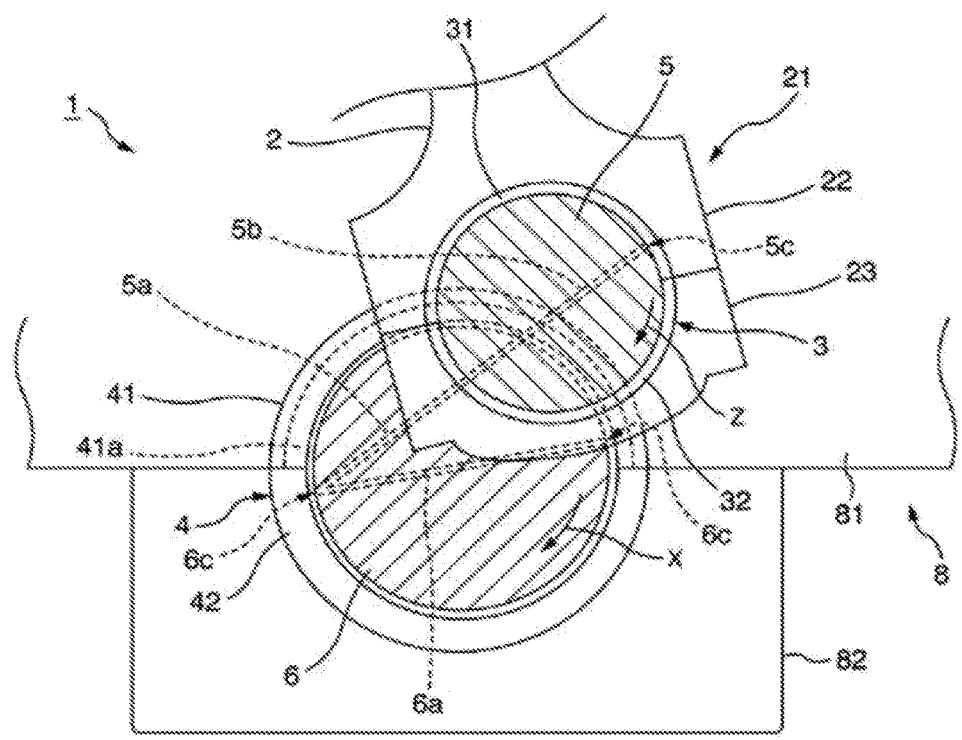
FIG. 1 is a schematic view illustrating a bearing device of a crankshaft.

FIG. 1 schematically illustrates a bearing device 1 of an internal combustion engine. The bearing device 1 includes journal portions 6 supported at a lower portion of a cylinder block 8, crank pins 5 that are formed integrally with the journal portions 6 and rotate about the journal portions 6, and a conrod 2 that transmits a reciprocating motion from the internal combustion engine to the crank pins 5. Also, the bearing device 1 further includes, as sliding bearings that support a crankshaft, a main bearing 4 that rotatably supports the journal portions 6 and a conrod bearing 3 that rotatably supports the cranks pin 5.

Note that although the crankshaft includes a plurality of journal portions 6 and a plurality of crank pins 5, one journal portion 6 and one crank pin 5 will be illustrated and described herein for convenience of explanation. In a positional relationship in a paper surface depth direction in FIG. 1, the journal portion 6 corresponds to the further side while the crank pin 5 corresponds to the closer side shown in the paper surface.

The journal portion 6 is pivotally supported at a cylinder block lower portion 82 of the internal combustion engine via the main bearing 4 constituted by a pair of half bearings 41 and 42. The half bearing 41 on the upper side in FIG. 1 includes an oil groove 41a formed over the entire length of an inner circumferential surface. Also, the journal portion 6 includes a lubricant path 6a penetrating in a diameter direction, and if the journal portion 6 rotates in the direction of the arrow X, inlet openings 6c at both ends of the lubricant path 6a alternately communicate with the oil groove 41a in the main bearing 4.

The crank pin 5 is pivotally supported at a large end portion housing 21 (rod-side large end portion housing 22 and a cap-side large end portion housing 23) of the conrod 2 via the conrod bearing 3 constituted by a pair of half bearings 31 and 32.

As described above, a lubricant ejected by an oil pump to the main bearing 4 passes through a through-hole formed in the wall of the main bearing 4 from an oil gallery formed in a cylinder block wall and is fed to the inside of the oil groove 41a formed along the inner circumferential surface of the main bearing 4.

Moreover, a first lubricant path 6a is formed to penetrate in the diameter direction of the journal portion 6 such that an inlet opening 6c of the first lubricant path 6a can communicate with the lubricant groove 41a, a second lubricant path 5a branched from the first lubricant path 6a of the journal portion 6 and passing through a crank arm portion (not illustrated) is formed, and the second lubricant path 5a communicates with a third lubricant path 5b formed to penetrate in the diameter direction of the crank pin 5.

In this manner, the lubricant is supplied from an ejection port 5c at an end portion of the third lubricant path 5b to a clearance formed between the crank pin 5 and the conrod bearing 3 through the first lubricant path 6a, the second lubricant path 5a, and the third lubricant path 5b.

In general, local and strong collision (contact) of parts near end portions in an axial line direction of sliding surfaces of the half bearings 41 and 42 constituting the main bearing 4 and the half bearings 31 and 32 constituting the conrod bearing 3 due to deflection or whirling occurring in the crankshaft is likely to occur during an operation of the internal combustion engine. The half bearing in the related art in which crowning constituted by an inclined surface is formed at one of or both end portions of the sliding surface in the axial line direction has a problem that a high temperature is likely to be achieved due to direct contact between the part near the end portion of the sliding surface in the axial line direction and the crankshaft and seizure is likely to occur in the sliding surface.

The present invention is adapted to address such a problem in the related art.

Hereinafter, an example in which the half bearing according to the present invention is applied to the conrod bearing 3 will be illustrated and described. However, the present invention is not limited to the conrod bearing 3 and can also be applied to the main bearing 4. Although both the half bearings in the pair constituting the conrod bearing 3 or the main bearing 4 can be the half bearings according to the present invention, one of them may be the half bearing according to the present invention while the other one may be the half bearing in the related art that does not include the inclined surface portion in the sliding surface.

Figure 2:
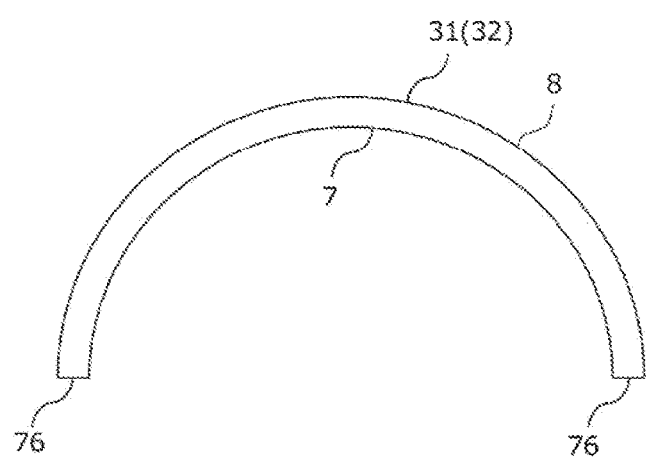
FIG. 2 is a diagram of a half bearing according to a first specific example of the present invention when seen in an axial line direction of the bearing.

FIG. 2 illustrates a first specific example of the half bearing (conrod bearing 3) according to the present invention. The conrod bearing 3 is formed by causing end surfaces 76 of the pair of half bearings 31 and 32 in the circumferential direction to abut on each other and combining the half bearings 31 and 32 into a cylindrical shape as a whole. The surface forming the inner circumferential surface of the cylindrical shape is a sliding surface 7, and the surface forming the outer circumferential surface is a back surface 8.

Note that the wall thicknesses of the half bearings 31 and 32 are constant in the circumferential direction. However, the wall thicknesses may be the maximum at the centers in the circumferential direction and successively decrease toward the sides of both the end surfaces 76 in the circumferential direction.

Figure 3A:
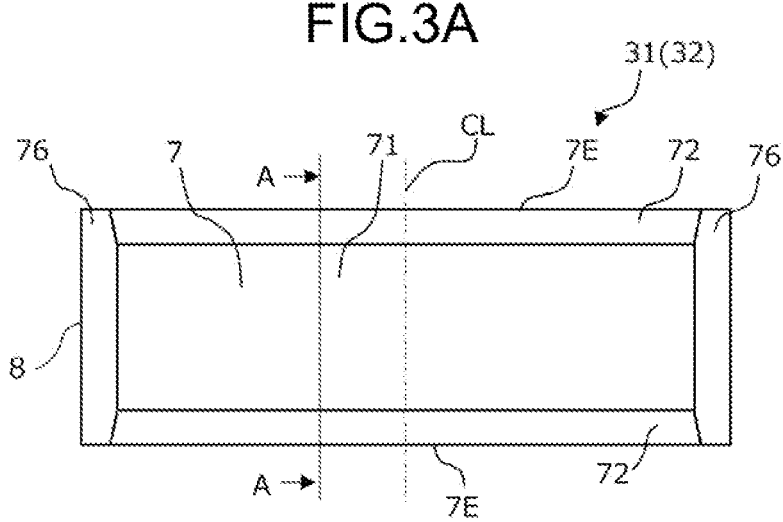
FIG. 3A is a plan view of the half bearing illustrated in FIG. 2 when seen from a sliding surface side.
Figure 3B:
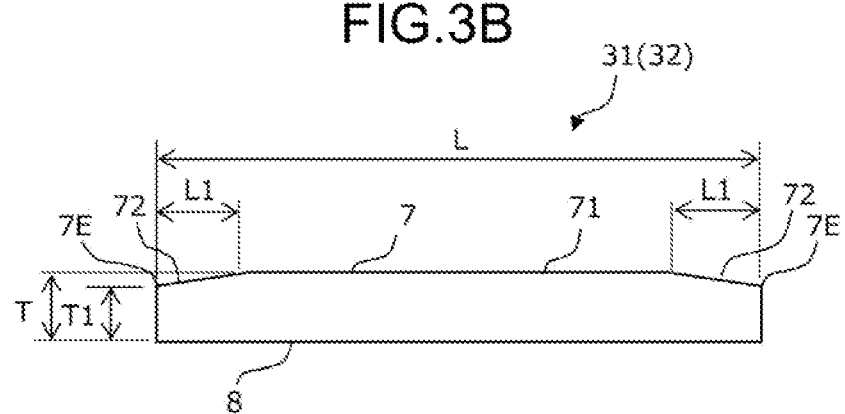
FIG. 3B is a sectional view along A-A in FIG. 3.

FIG. 3A illustrates an example of the half bearings 31 and 32 when seen from the sliding surface side. FIG. 3B illustrates a section along the portion A-A in FIG. 3A. The sliding surface 7 of the half bearings 31 and 32 includes a "plane portion" 71 that is parallel to the axial line direction of the half bearings 31 and 32 and an "inclined surface portion" 72 that is adjacent to the plane portion 71. The plane portion 71 is located at a center portion of the half bearings 31 and 32 in the axial line direction, and the inclined surface portion 72 is located at both end portions of the sliding surface 7 in the axial line direction. The inclined surface portion 72 is displaced from the plane portion 71 toward the end portion of the sliding surface 7 in the axial line direction such that the sliding surface 7 successively comes close to the back surface 8. In this example, the inclined surface portion 72 is present over the entire length of the sliding surface 7 in the circumferential direction. The width of each of the inclined surface portions 72 and 72 (the length of the half bearings in the axial line direction) is constant in the circumferential direction of the half bearings 31 and 32. Although the inclined surface portions 72 and 72 are preferably formed symmetrically with respect to the center of the sliding surface 7 in the width direction, the inclined surface portions 72 and 72 may be formed asymmetrically.

A plurality of circumferential-direction grooves 73 (not illustrated in FIGS. 3A and 3B) are formed to be adjacent to each other in the sliding surface 7 of the half bearings 31 and 32. The plurality of circumferential-direction grooves 73 extend to be parallel to the circumferential direction of the half bearings 31 an 32 and are formed over the entire length of the sliding surface 7 in the circumferential direction. The circumferential-direction grooves 73 are disposed to be aligned in the axial line direction of the half bearings 31 and 32 and are formed over the entire width of the sliding surface 7. Note that the circumferential-direction grooves 73 are allowed to be slightly inclined (1° at a maximum) with respect to the circumferential direction of the half bearings 31 and 32. Also, the inclined surface portion 72 may be formed only at one of end portions of the sliding surface 7 in the axial line direction.

Figure 4:
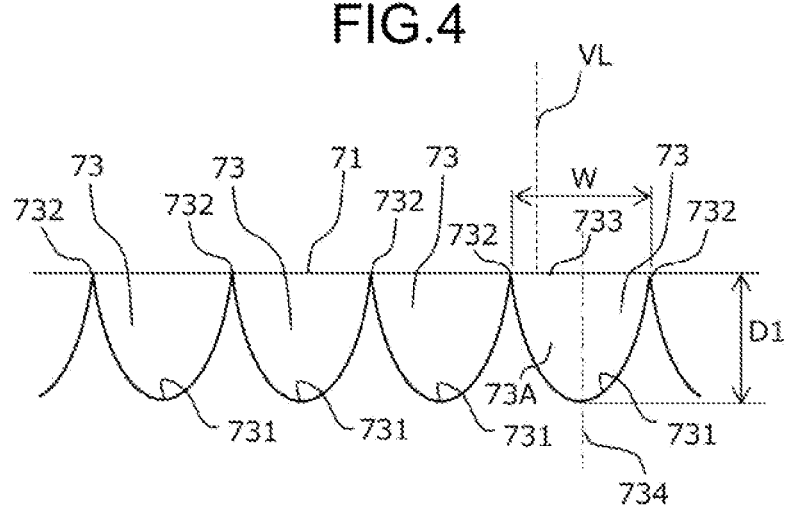
FIG. 4 is a sectional view of circumferential-direction grooves in a plane portion of the sliding surface of the half bearing illustrated in FIG. 2.
Figure 5A:
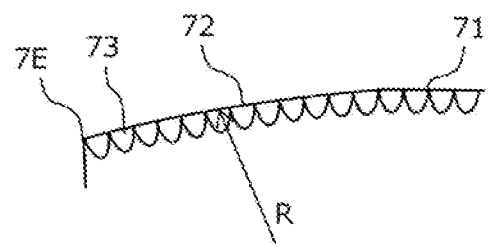
FIG. 5A is a sectional view of the circumferential-direction grooves in an inclined surface portion of the sliding surface of the half bearing illustrated in FIG. 2.
Figure 5B:
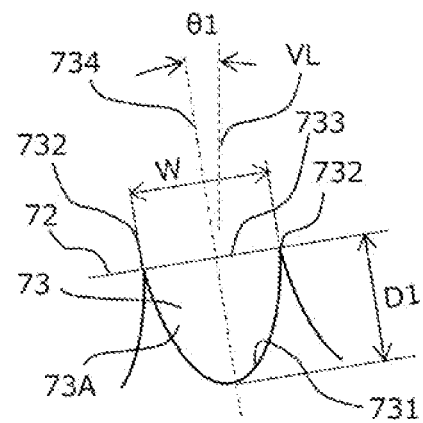
FIG. 5B is a sectional enlarged view of the circumferential-direction grooves in the inclined surface portion of the sliding surface of the half bearing illustrated in FIG. 2.

FIG. 4 illustrates a sectional view of the circumferential-direction grooves 73 in the plane portion 71 of the sliding surface 7 of the half bearings 31 and 32 illustrated in FIG. 2. FIG. 5A illustrates a sectional view of the circumferential-direction grooves 73 in the inclined surface portion 72 of the sliding surface 7 of the half bearings 31 and 32 illustrated in FIG. 2. FIG. 5B illustrates a sectional view of the circumferential-direction grooves 73 illustrated in FIG. 5A in a further enlarged manner. These sectional views illustrate the section of the half bearings 31 and 32 in the axial line direction. Note that hereinafter, the circumferential-direction grooves 73 are depicted in an exaggerated manner in each drawing for easy understanding.

The circumferential-direction grooves 73 include curved recessed surfaces 731 when seen in the section of the half bearings 31 and 32 in the axial line direction. Apex portions 732 are formed between recessed surfaces 731 of the adjacent circumferential-direction grooves 73. A line connecting the apex portions 732 represents the sliding surface. In a microscopical view, no flat region is present in the sliding surface 7.

The groove width W of the circumferential-direction grooves is defined as a length of an imaginary straight line 733 linearly connecting the apex portions 732 on both sides of each circumferential-direction groove 73. A groove center line 734 is defined as a line that passes through the center position of the length of the imaginary straight line 733 and extends in the normal direction with respect to the imaginary straight line 733. The groove depth D1 of the circumferential-direction grooves 73 is defined as a length to a position where the recessed surfaces 731 are the most separated from the imaginary straight line 733 in the normal direction with respect to the imaginary straight line 733. The position of the maximum groove depth D1 of each circumferential-direction groove 73 is on the groove center line 734.

Areas surrounded by the imaginary straight lines 733 and the recessed surfaces 731 are defined as groove sectional areas 73A. Each circumferential-direction groove 73 has the same groove width W, the same groove depth D1, and the same groove sectional area 73A. Moreover, the groove width W, the groove depth D1, and the groove sectional area 73A of the circumferential-direction groove 73 are the same at any position in the circumferential direction.

Also, the shape of the recessed surface 731 of each circumferential-direction groove 73 is formed symmetrically with respect to the groove center line 734. Two groove sectional areas obtained by dividing the groove sectional area 73A of each circumferential-direction groove 73 by the groove center line 734 are the same as each other.

As illustrated in FIG. 5A, the inclined surface portion 72 of the sliding surface 7 is a curve slightly projecting toward the inside in the radial direction of the half bearings 31 and 32.

An angle formed by a vertical line VL extending in the vertical direction from the plane portion 71 of the sliding surface 7 toward the axial line of the half bearings 31 and 32 and the groove center lines 734 of the circumferential-direction grooves 73 is defined as a groove inclination angle $\theta1$. The groove inclination angle $\theta1$ of each circumferential-direction groove 73 in the plane portion 71 of the sliding surface 7 is 0°. Note that the groove center line 734 of each circumferential-direction groove 73 in the plane portion 71 of the sliding surface 7 is allowed to be slightly inclined ($1\times10^{-2\circ}$ at a maximum) relative to the vertical line VL due to an error at the time of working of the circumferential-direction grooves 73.

The groove center lines 734 in the inclined surface portion 72 of the sliding surface 7 is inclined relative to the vertical line VL toward the end portion of the sliding surface 7 in the axial line direction, the groove inclination angle $\theta1$ of the circumferential-direction groove 73 that is the closest to the plane portion 71 is a minimum angle, and the groove inclination angle $\theta1$ successively increases toward the end portion of the sliding surface 7 in the axial line direction.

The conrod bearing 3 in the present embodiment is formed by causing end surfaces 76 of the pair of half bearings 31 and 32 in the circumferential direction to abut on each other and combining the half bearings 31 and 32 into a cylindrical shape as a whole. The half bearings 31 and 32 can have sliding layers of a Cu bearing alloy or an Al bearing alloy. Alternatively, it is possible to have sliding layers of a Cu bearing alloy or an Al bearing alloy on back metal layers made of an Fe alloy. Also, sliding layers including a surface portion made of a Cu bearing alloy or an Al bearing alloy and any one kind selected from soft Bi, Sn, and Pb or made of an alloy containing such metal as a main constituent and a surface portion made of a resin composition containing a synthetic resin as a main constituent and disposed on the sliding surface side beyond the bearing alloy may be included.

Next, actions of the half bearings 31 and 32 according to the present invention will be described with reference to FIGS. 6A and 6B. During a high-speed operation of the internal combustion engine, local and strong collision (contact) of a part (inclined surface portion 72) near the end portions in the axial line direction of the sliding surfaces 7 of the half bearings 31 and 32 constituting the conrod bearing 3 against the crankshaft is likely to occur due to deflection or whirling occurring in the crankshaft. If deflection or whirling occurs in the crankshaft 5, then the inclined surface portions 72 of the sliding surfaces 7 of the half bearings 31 and 32 and the surface of the crankshaft 5 repeat a separating operation and an approaching operation.

Figure 6A:
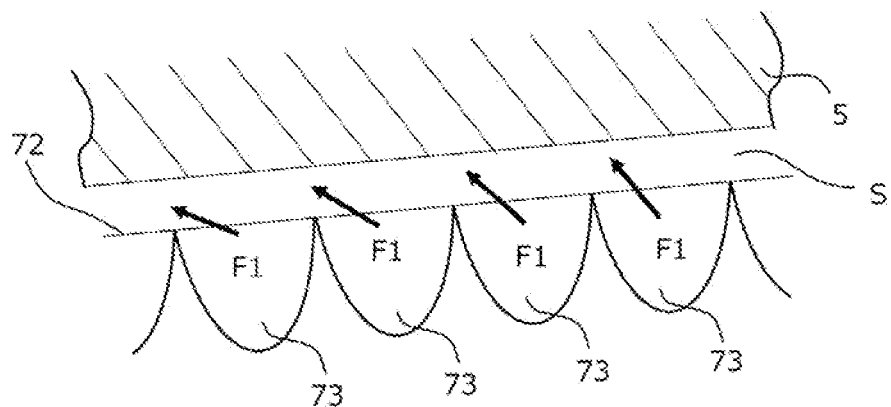
FIG. 6A is a sectional view for explaining actions of the present invention.
Figure 6B:
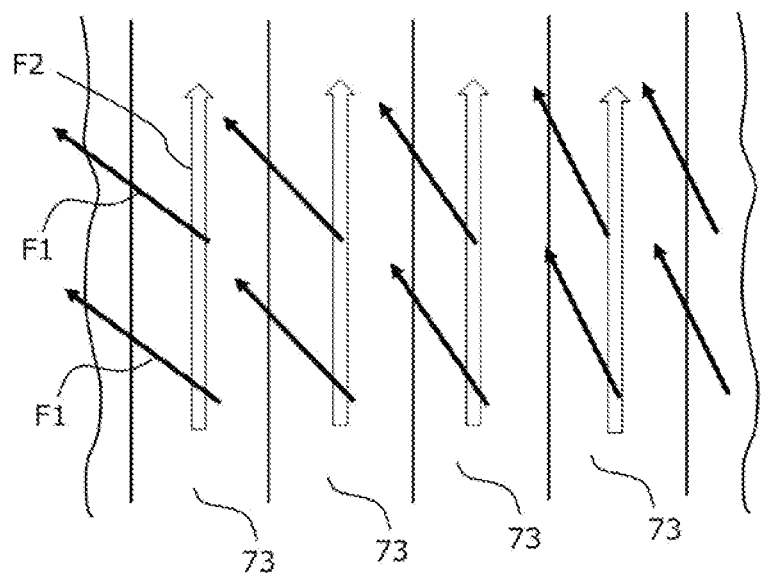
FIG. 6B is a plan view for explaining actions of the present invention.

A state immediately before the inclined surface portion 72 of the sliding surface 7 of the half bearings 31 and 32 and the surface of the crankshaft 5 are brought into direct contact with each other after the inclined surface portion 72 of the sliding surface 7 and the surface of the crankshaft 5 operate to relatively approach each other from a separated state is illustrated in FIGS. 6A and 6B. FIG. 6A illustrates a section of the inclined surface portion 72 of the sliding surface 7. FIG. 6B illustrates a view of the inclined surface portion 72 when seen from the bearing center side with the crankshaft 5 omitted.

When the surface of the crankshaft 5 comes close to the inclined surface portion 72, an oil flowing through a clearance S in the circumferential direction is compressed toward the inside (recessed surfaces 731) of the plurality of circumferential-direction grooves 73 in the inclined surface portion 72 by the surface of the crankshaft 5. The oil inside the circumferential-direction groove has an increasing pressure by being pressed by the oil compressed and flowing thereinto later, not only flows inside the circumferential-direction groove in the circumferential direction but also flows into (flows backward toward) the clearance S between two surfaces, and thereby forms an oil flow F1. The groove center line 734 of the circumferential-direction groove 73 in the inclined surface portion 72 is inclined toward the side of the end portion 7E of the sliding surface 7 in the axial line direction. Therefore, the oil flow F1 flowing out from the inside of the circumferential-direction groove mainly flows toward the surface side of the crankshaft 5 with an inclination toward the side of the end portion 7E of the sliding surface 7 in the axial line direction. At this time, an oil flow F2 flowing in the circumferential direction in the clearance S is formed along with the surface of the rotating crankshaft 5 near the surface of the crankshaft 5 (FIG. 6B).

Due to collision of the oil flow F1 and the F2 crossing each other, the oil between the inclined surface portion 72 and the surface of the crankshaft 5 (inside the clearance S and the circumferential-direction grooves 73) is temporarily brought into a turbulence state. Since the heat of the inclined surface portion 72 in the sliding surface 7 caused through the contact with the crankshaft 5 is efficiently transmitted to the oil in the turbulence state, a temperature rise that may lead to cooling of the inclined surface portion 72 and then seizure is curbed.

Also, in a case in which the oil that has been temporarily brought into a turbulence state and has an increasing temperature through cooling of the inclined surface portion 72 remains in the clearance S between the two surfaces without being discharged to the outside of the bearings, a difference in temperature from the inclined surface portion 72 is reduced even if the turbulence state is achieved again due to the above principle, and the cooling effect is thus degraded.

Each circumferential-direction groove 73 in the inclined surface portion 72 of the sliding surface 7 is adapted such that the groove inclination angle θ1 of the circumferential-direction groove 73 that is the closest to the plane portion 71 is the minimum angle and the groove inclination angle θ1 successively increases toward the end portion 7E of the sliding surface 7 in the axial line direction.

Figure 6C:
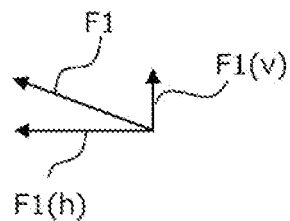
FIG. 6C is a component exploded view of an oil flow F1 on an end portion side.
Figure 6D:
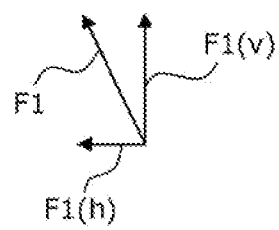
FIG. 6D is a component exploded view of the oil flow F1 on a plane portion side.

FIG. 6C illustrates the oil flow F1 in the circumferential-direction groove disposed near the end portion 7E in the axial line direction in the inclined surface portion 72 of the sliding surface 7, and the oil flow F1 is decomposed into a component F1(v) directed to the surface side of the crankshaft 5 and a component F1(h) directed to the side of the end portion 7E in the axial line direction. FIG. 6D illustrates the oil flow F1 in the circumferential-direction groove disposed near the plane portion 71 in the inclined surface portion 72 of the sliding surface 7, and the oil flow F1 is decomposed into a component F1(v) directed to the surface side of the crankshaft 5 and a component F1(h) directed to the side of the end portion 7E in the axial line direction. Note that in FIGS. 6C and 6D, the upper side in the drawings corresponds to the surface side of the crankshaft 5 and the left side in the drawings corresponds to the side of the end portion 7E in the axial line direction.

The component F1(h) increases in the circumferential-direction groove portions that are closer to the end portion 7E in the axial line direction. Therefore, the oil at a temperature that has been raised in the clearance S is likely to flow toward the end portion 7E of the sliding surface 7 in the axial line direction. At the same time, F1(v) increases in the circumferential-direction groove portions that are closer to the plane portion 71. Therefore, the oil at a temperature that has been raised in the clearance S serves as a resistance of an oil flow toward the plane portion 71 inside the clearance S. Therefore, the oil at a temperature that has been raised in the clearance S is likely to be discharged from the end portion 7E of the sliding surface 7 in the axial line direction to the outside of the half bearings 31 and 32.

In a case in which the groove center line 734 of each circumferential-direction groove 73 in the inclined surface portion 72 is inclined toward the center portion side of the sliding surface 7 in the axial line direction unlike the configuration in the present embodiment, the oil flow F1 flows toward the center portion side of the sliding surface 7 in the axial line direction. Therefore, the oil at an increasing temperature is less likely to be discharged to the outside of the half bearings 31 and 32. Also, in a case in which the groove inclination angle θ1 of each circumferential-direction groove 73 in the inclined surface portion 72 is set to be constant unlike the configuration in the present embodiment, the component F1(v) of the oil flow F1 in each circumferential-direction groove 73 becomes constant. Therefore, the oil at the increasing temperature may flow toward the plane portion 71 inside the clearance S and is less likely to be discharged to the outside of the half bearings 31 and 32.

Figure 7:
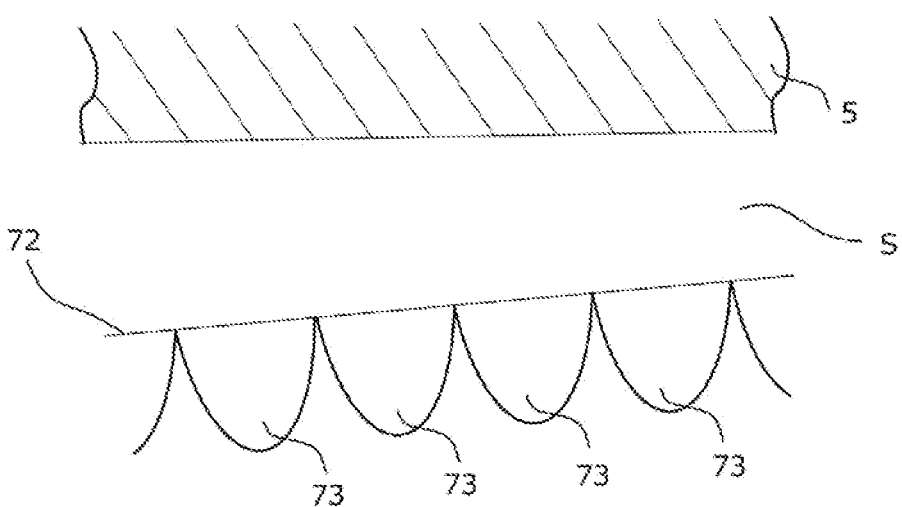
FIG. 7 is a sectional view for explaining actions at the time of a regular operation.

FIG. 7 illustrates a view of FIG. 6 during a regular operation of the internal combustion engine. FIG. 7 illustrates a section of the inclined surface portion 72 of the sliding surface 7. In general, a pressure loss occurs, and a mechanical loss of the internal combustion engine occurs, when the oil in a laminar flow state is brought into a turbulence state. As illustrated in FIG. 7, the amount of deflection or whirling in the crankshaft is small during a regular operation, and a sufficient clearance S is formed between the inclined surface portion 72 of the sliding surface 7 of the half bearings 31 and 32 and the surface of the crankshaft 5. Therefore, the amount of oil compressed and flow toward the inside of each circumferential-direction groove 73 in the inclined surface portion 72 by the surface of the crankshaft 5 is small, the pressure of the oil inside each circumferential-direction groove 73 does not become high, and the oil flow F1 is thus not formed or becomes weak. Therefore, the oil that is present in the clearance S flows in the laminar flow state in the circumferential direction and thus does not cause a pressure loss and a mechanical loss of the internal combustion engine.

The groove depth D1 of the circumferential-direction grooves 73 is preferably set to 1.5 μm to 10 μm. The groove width W of the circumferential-direction grooves 73 is preferably set to 0.05 to 0.25 mm. In a case in which the groove depth D1 of the circumferential-direction grooves 73 exceeds 10 μm or the groove width W exceeds 0.25 mm, the oil flow F1 caused is weakened. In a case in which the groove depth D1 of the circumferential-direction grooves 73 is less than 1.5 μm or the groove width W is less than 0.05 mm, the amount of the oil flow F1 flowing out from each circumferential-direction groove 73 to the clearance S decreases. Therefore, the inclined surface portion 72 is not sufficiently cooled. The width (the length of the half bearing in the axial line direction) L1 of the inclined surface portion 72 is preferably set to be a length corresponding to 2 to 10% of the width L of the sliding surface 7. If the width L1 of the inclined surface portion 72 is less than 2% of the width L of the sliding surface 7, the region where the oil is brought into a turbulence state is excessively small, and the inclined surface portion may not sufficiently be cooled. If the width L1 exceeds 10%, the region of the plane portion 71 in the sliding surface 7 that supports the crankshaft 5 during a regular operation of the internal combustion engine decreases, which is not preferable. Note that it is preferable that ten or more circumferential-direction grooves 73 are formed, and it is more preferable that fifteen or more circumferential-direction grooves 73 are formed, in each inclined surface portion 72.

The wall thickness T1 of the inclined surface portion 72 at the end portion 7E of the sliding surface 7 in the axial line direction is preferably smaller than the wall thickness T of the plane portion 71 by 2 to 10 μm. The difference (T−T1) of the wall thicknesses corresponds to the depth of the inclined surface portion. If the depth of the inclined surface portion is less than 2 μm, only the part near the end portion E of the inclined surface portion 72 of the sliding surface 7 in the axial line direction of the sliding surface 7 is brought into a local and strong contact with the crankshaft 5, and the temperature of the inclined surface portion 72 may be raised when the amount of deflection or whirling of the crankshaft increases during a high-speed operation of the internal combustion engine. If the depth of the inclined surface portion exceeds 10 μm, only the part of the inclined surface portion 72 of the sliding surface 7 adjacent to the plane portion 71 of the sliding surface 7 is brought into a local and strong contact with the crankshaft 5, and the temperature of the inclined surface portion 72 may be raised. Note that the wall thickness means a length in the radial direction of the half bearings 31 and 32 between the sliding surface (the line connecting the apex portions 732 of the circumferential-direction grooves 73) and the back surface 8 of the half bearings 31 and 32.

The groove inclination angle θ1 of the circumferential-direction grooves 73 that are closest to the end portion of the sliding surface 7 of the inclined surface portion 72 in the axial line direction is preferably set to $3 \times 10^{-2}$° to $30 \times 10^{-2}$°. In a case in which the groove inclination angle θ1 of the circumferential-direction grooves 73 that are the closest to the end portion 7E of the sliding surface 7 of the inclined surface portion 72 in the axial line direction is less than $3 \times 10^{-2}$°, an oil flow F1 from each of the circumferential-direction grooves 73 of the inclined surface portion 72 toward the clearance S may not sufficiently be formed. Also, in a case in which the groove inclination angle θ1 of the circumferential-direction grooves 73 that are the closest to the end portion 7E of the sliding surface 7 of the inclined surface portion 72 in the axial line direction exceeds $30 \times 10^{-2}$°, the oil in the clearance S may become likely to be discharged to the outside of the half bearings 31 and 32 even during a regular operation of the internal combustion engine.

Each of the circumferential-direction grooves 73 formed in the plane portion 71 and the inclined surface portion 72 of the sliding surface 7 has the same groove depth D1, the same groove width W, and the same groove sectional area 73A at any position in the circumferential direction. The pressure of the oil pressurized and flowing into each circumferential-direction groove 73 becomes equivalently high substantially at the same time, and the oil flow F1 flowing backward from each circumferential-direction groove toward the clearance S is formed at substantially the same time, when the surface of the crankshaft 5 comes close to the inclined surface portion 72 of the sliding surface 7 during a high-speed operation of the internal combustion engine, by the groove depth D1, the groove width W, and the groove sectional areas 73A of each circumferential-direction groove 73 in the inclined surface portion 72 being the same. Therefore, the entire oil that is present in the clearance S between the inclined surface portion 72 and the surface of the crankshaft 5 is likely to be brought into a turbulence state at the same time.

In a case in which the groove depth D1, the groove width W, and the groove sectional area 73A of each circumferential-direction groove 73 in the inclined surface portion 72 of the sliding surface 7 are not constant unlike the present embodiment, the pressure of the oil pressurized and flowing into each circumferential-direction groove 73 does not become the same pressure at the same time, and the oil flow F1 flowing backward from each circumferential-direction groove toward the clearance S is not formed at substantially the same time, when the surface of the crankshaft 5 comes close to the inclined surface portion 72 of the sliding surface 7. Alternatively, the oil flow F1 is not formed (the oil flows in the circumferential direction inside the circumferential-direction grooves 73) in the circumferential-direction grooves 73 with relatively large groove depths D1, groove widths W, and groove sectional areas 73A from among the plurality of circumferential-direction grooves 73 since the pressure of the oil flowing thereinto does not increase. Therefore, the entire oil that is present in the clearance S is not brought into a sufficient turbulence state. The effect of cooling the inclined surface portion 72 thus becomes insufficient.

Figure 8A:
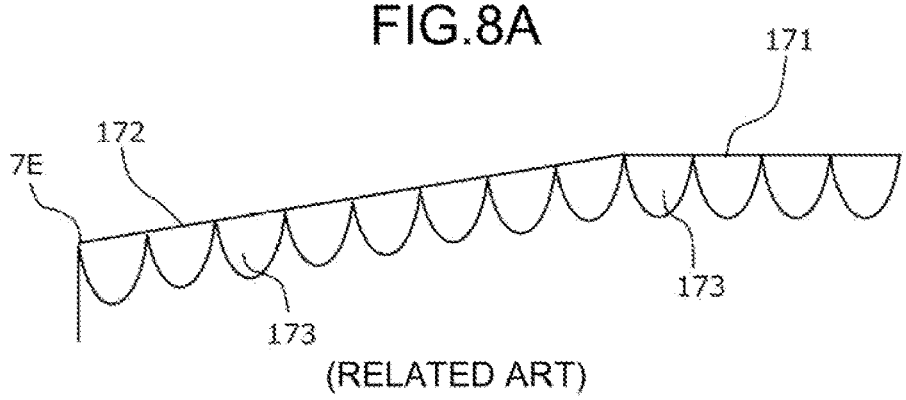
FIG. 8A is a sectional view of a sliding surface according to a comparative example.
Figure 8B:
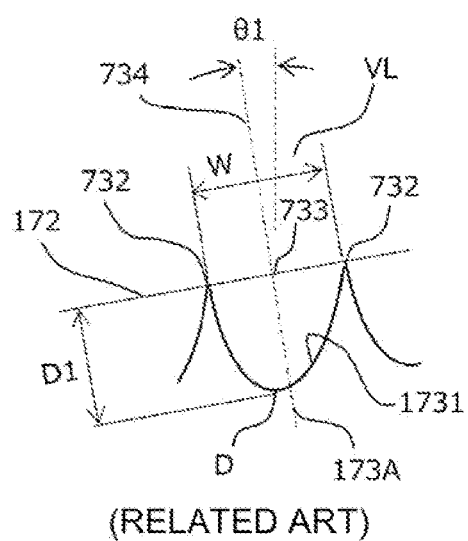
FIG. 8B is a sectional enlarged view of a circumferential-direction groove in an inclined surface portion according to the comparative example.
Figure 8C:
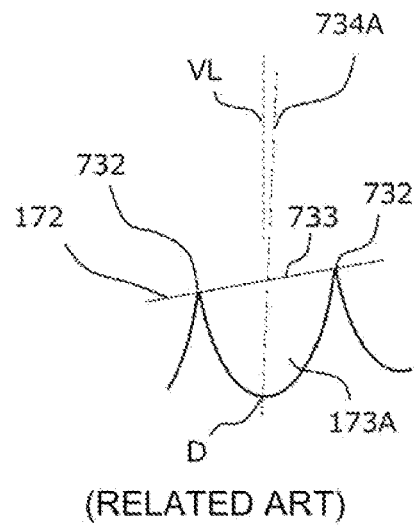
FIG. 8C is a sectional enlarged view of the circumferential-direction groove in the inclined surface portion according to the comparative example.

FIG. 8A illustrates a section of a sliding surface in the related art in which a plurality of circumferential-direction grooves 173 that are different from those in the present embodiment are formed in the inclined surface portion 172 of the sliding surface 17 according to International Publication No. WO 2010/038588. FIGS. 8B and 8C illustrate enlarged sections of a circumferential-direction groove 173 in the inclined surface portion 172 illustrated in FIG. 8A. The sliding surface is formed in accordance with the method described in Paragraphs 0023 to 0025 in International Publication No. WO 2010/038588. In other words, when an inner diameter surface of a half bearing material is worked (the circumferential-direction grooves 173 are formed) using a cylindrical drill spindle with a cutting cartridge that is driven by a rotation-type drive device, the sliding surface (the circumferential-direction grooves 173) is formed through a rotating operation of the drill spindle and a linear motion operation of the drill spindle in the axial line direction. The sliding surface (circumferential-direction grooves 173) is formed in the inclined surface portion 172 with a varying bearing wall thickness by causing the drill spindle to further operate in a direction that perpendicularly intersects the axial line direction.

The circumferential-direction grooves 173 in the plane portion 171 in the related art has the same configuration as that of the circumferential-direction grooves 73 in the plane portion 71 according to the present invention. Although each circumferential-direction groove 173 in the inclined surface portion 172 according to the related art has the same groove depth D1, the same groove width W, and the same groove sectional area 173A, but the groove depth D1, the groove width W, and the groove sectional area 173A are smaller than the groove depth D1, the groove width W, and the groove sectional area 173A of the circumferential-direction grooves 173 in the plane portion 171.

Also, the position D of the maximum groove depths of the circumferential direction grooves 173 in the inclined surface portion 172 are not located on the groove center lines 734 and are located on the end portion side of the sliding surface in the axial line direction beyond the groove center lines 734. Therefore, the shape of the recessed surface 1731 of each circumferential-direction groove 173 is formed to e asymmetric with respect to the groove center line 734. Therefore, two groove sectional areas obtained by dividing the groove sectional area 73A of each circumferential-direction groove 173 by the groove center line 734 are not the same as each other. Also, the groove inclination angle θ1 formed by the vertical line VL extending in the vertical direction from the plane portion 171 of the sliding surface 17 toward the axial line of the half bearings and the groove center lines 734 is the same for each of the circumferential-direction grooves 173 (FIG. 8B).

Here, a second groove center line 734A of each circumferential-direction groove 173 in the inclined surface portion 172 is defined (FIG. 8C). The second groove center line 734A is defined as a straight line that passes through the position D of the maximum groove depth and equally divides the groove sectional area 173A into two parts. The second groove center line 734A is slightly inclined toward the center portion side of the sliding surface in the axial line direction. Therefore, the configuration in which the plurality of circumferential-direction grooves 173 are formed in the inclined surface portion 172 of the sliding surface according to the related art cannot obtain the cooling action as in the present invention. Even if the cooling action can be obtained, the action of discharging the oil at an increasing temperature to the outside of the half bearings cannot be obtained.

Hereinafter, non-restrictive specific examples of other embodiments of the present invention will be described.

Second Specific Example

Figure 9:
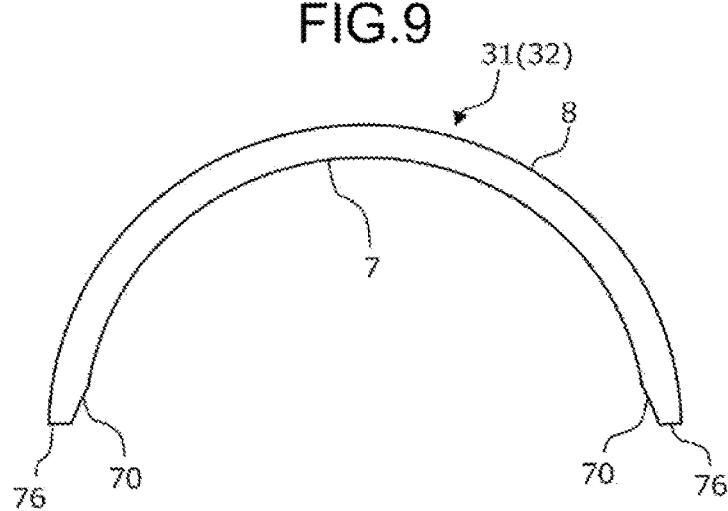
FIG. 9 is a view of a half bearing according to a second specific example of the present invention when seen from an axial line direction of the bearing.
Figure 10:
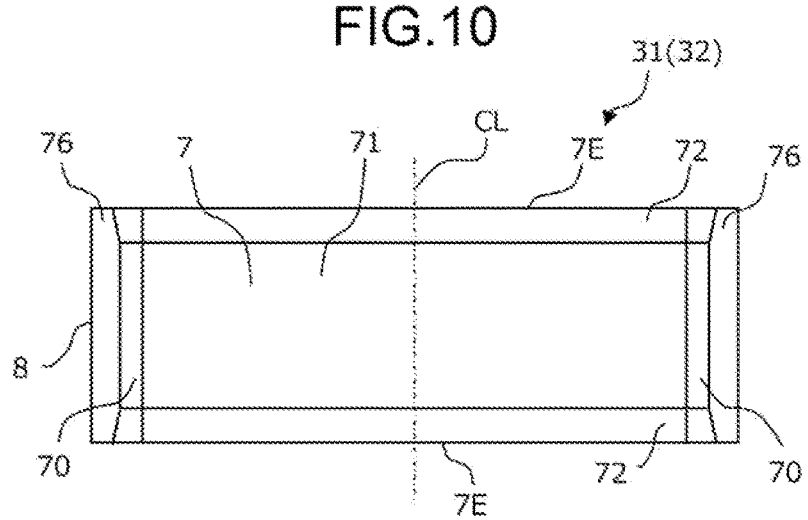
FIG. 10 is a plan view of the half bearing illustrated in FIG. 9 when seen from a sliding surface side.

FIG. 9 illustrates a view of half bearings 31 and 32 according to a second specific example of the present invention when seen in an axial line direction of the bearings. FIG. 10 illustrates a plan view of the half bearings 31 and 32 illustrated in FIG. 9 when seen from a sliding surface side. FIG. 10 provides illustration from which circumferential-direction grooves 73 are omitted. The half bearings 31 and 32 include two crash reliefs 70 formed on the inner circumferential surface side to be adjacent to both circumferential-direction end portions 76. The other configurations are the same as the configurations of the half bearings 31 and 32 that have already been described above. The surfaces of the crash reliefs 70 constitute a part of the sliding surface 7.

Note that the crash reliefs 70 are surfaces formed by reducing the thickness of wall portions in circumferential-direction end portion regions of the half bearings 31 and 32 in the radial direction from the original sliding surface 7, and these are formed in order to absorb positional deviation or deformation of the circumferential-direction end surfaces 76 of the half bearings that may occur when the pair of half bearings 31 and 32 are assembled with the conrod 2, for example. Therefore, the curvature center positions of the surfaces of the crash reliefs 70 are different from the curvature center position of the sliding surface 7 in the other region (see SAE J506 (Item 3.26 and Item 6.4), DIN1497, Section 3.2, JIS D3102). In general, the depth of the crash reliefs 70 in the circumferential-direction end surfaces of the half bearings (the distance from the original sliding surface to the crash reliefs 70 in the circumferential-direction end surfaces 76) in a small-sized internal combustion engine bearing for a vehicle is about 0.01 to 0.05 mm.

Note that the plane portion 71 and the inclined surface portion 72 that have described above are formed in the surfaces of the crash reliefs 70 as well. The circumferential-direction grooves 73 that have been described above extend to be parallel to the circumferential direction of the half bearings 31 and 32 and are formed over the entire lengths of the surfaces of the crash reliefs 70 in the circumferential direction. The circumferential-direction grooves 73 are disposed to be aligned in the axial line direction of the half bearings 31 and 32 and are formed over the entire widths of the surfaces of the crash reliefs 70. Note that the circumferential-direction grooves 73 are allowed to be slightly inclined (1° at a maximum) relative to the circumferential direction of the half bearings 31 and 32. Note that the dimensions and the shapes of the inclined surface portion, the plane portion, and the circumferential-direction grooves in the surfaces of the crash reliefs 70 are the same as the dimensions and the shapes of the inclined surface portion, the plane portion, and the circumferential-direction grooves in the sliding surface 7 other than the crash reliefs 70.

Third Specific Example

Figure 11:
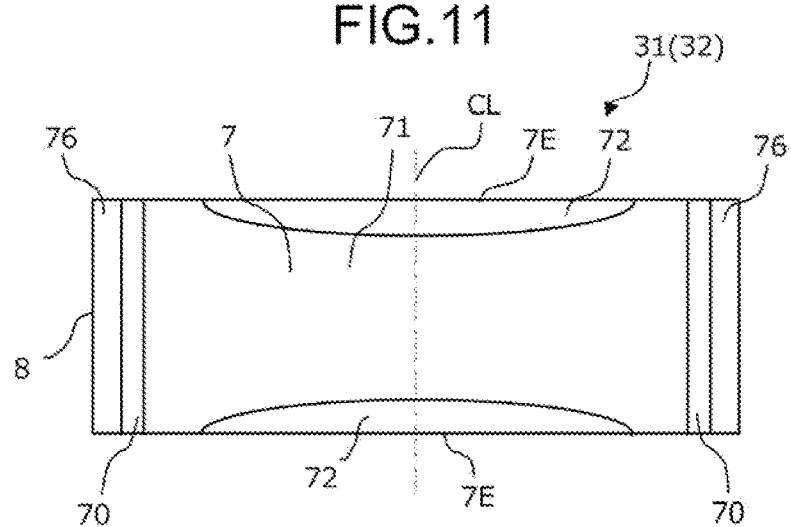
FIG. 11 is a plan view of a half bearing according to a third specific example of the present invention when seen from a sliding surface side.

FIG. 11 illustrates a plan view of half bearings 31 and 32 according to a third specific example of the present invention when seen from a sliding surface side. The inclined surface portion 72 has a shorter length in the circumferential direction than the length of the sliding surface 7 in the circumferential direction and is formed to include a part of the length of the sliding surface 7 in the circumferential direction. FIG. 11 also provides illustration from which the circumferential-direction grooves 73 are omitted. The other configurations are the same as the configurations of the half bearings 31 and 32 that have already been described above.

In the inclined surface portion 72, the width L1 of the inclined surface portion 72 is the maximum at the center of the length in the circumferential direction and successively decreases toward both end portions of the length in the circumferential direction. The inclined surface portion 72 has the maximum depth (the difference (T−T1) between the wall thickness T of the plane portion 71 and the wall thickness T1 of the inclined surface portion 72 at the end portion 7E of the sliding surface 7 in the axial line direction) at the center of the length in the circumferential direction, and the depth of the inclined surface portion 72 successively decreases toward both end portions of the length in the circumferential direction. The width L1 and the depth of the inclined surface portion 72 are preferably the dimensions described above at the center portion of the length of the inclined surface portion 72 in the circumferential direction.

Although the center of the length of the inclined surface portion 72 in the circumferential direction is located at the circumferential-direction center CL of the half bearings 31 and 32, the present invention is not limited thereto. The center of the length of the inclined surface portion 72 in the circumferential direction may be located at a point other than the circumferential-direction center CL of the half bearings 31 and 32.

Although each of the circumferential-direction groove 73 in the inclined surface portion 72 has the same groove depth D1, the same groove width W, and the same groove sectional areas 73A over the entire length of the inclined surface portion 72 in the circumferential direction, the groove inclination angle θ1 is a maximum angle at the center of the length of the inclined surface portion 72 in the circumferential direction and successively decreases toward both end portions of the length in the circumferential direction. The groove inclination angle θ1 of the circumferential-direction grooves 73 in the inclined surface portion 72 is preferably the same dimension as that described above at the center portion of the length of the inclined surface portion 72 in the circumferential direction.

Fourth Specific Example

Figure 12:
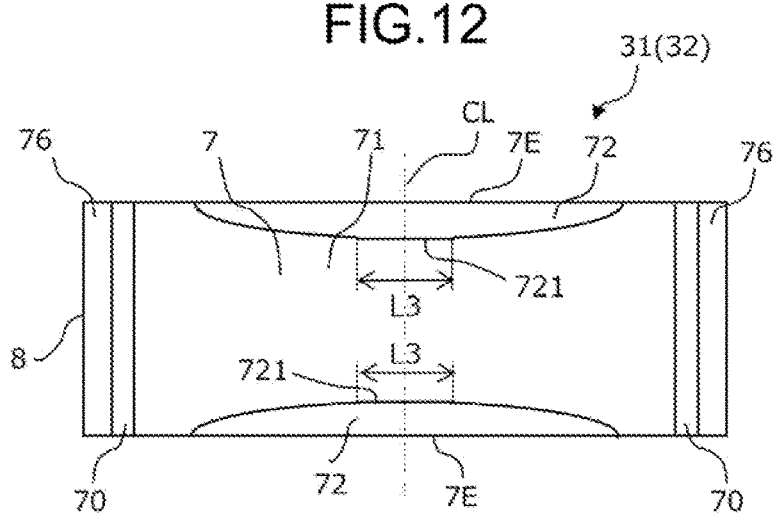
FIG. 12 is a plan view of the half bearing according to a fourth specific example of the present invention when seen from a sliding surface side.

FIG. 12 illustrates a plan view of the half bearings 31 and 32 according to a fourth specific example of the present invention when seen from the sliding surface side. The length of the inclined surface portion 72 in the circumferential direction is shorter than the length of the sliding surface 7 in the circumferential direction and forms a part of the length of the sliding surface 7 in the circumferential direction. FIG. 12 also provides illustration from which the circumferential-direction grooves 73 are omitted. The other configurations are the same as the configurations of the half bearings 31 and 32 that have already been described.

The inclined surface portion 72 includes a parallel portion 721 where the width of the inclined surface portion 72 is constant, at the center of the length in the circumferential direction. The width L1 of the inclined surface portion 72 is a maximum width at the parallel portion 721 and successively decreases toward both end portions of the length in the circumferential direction. The inclined surface portion 72 has the maximum depth at the parallel portion 721, and the depth of the inclined surface portion 72 successively decreases toward both end portions of the length in the circumferential direction. The width L1 and the depth of the inclined surface portion 72 are preferably the dimensions described above in the parallel portion 721.

Although the center of the length L3 of the parallel portion 721 in the circumferential direction is located at the circumferential-direction center CL of the half bearings 31 and 32, the present invention is not limited thereto. The center of the length L3 of the parallel portion 721 in the circumferential direction may be located at a point other than the circumferential-direction center CL of the half bearings 31 and 32.

Although each circumferential-direction groove 73 in the inclined surface portion 72 has the same groove depth D1, the same groove width W, and the same groove sectional area 73A over the entire length of the inclined surface portion 72 in the circumferential direction, the groove inclination angle θ1 is constant and maximum over the entire length L3 of the parallel portion 721 in the circumferential direction and successively decreases from the end portion of the length L3 of the parallel portion 721 in the circumferential direction toward both end portions of the length of the inclined surface portion 72 in the circumferential direction. The groove inclination angle θ1 of the circumferential-direction grooves 73 in the inclined surface portion 72 is preferably the dimension described above in the parallel portion 721.

Fifth Specific Example

Figure 13:
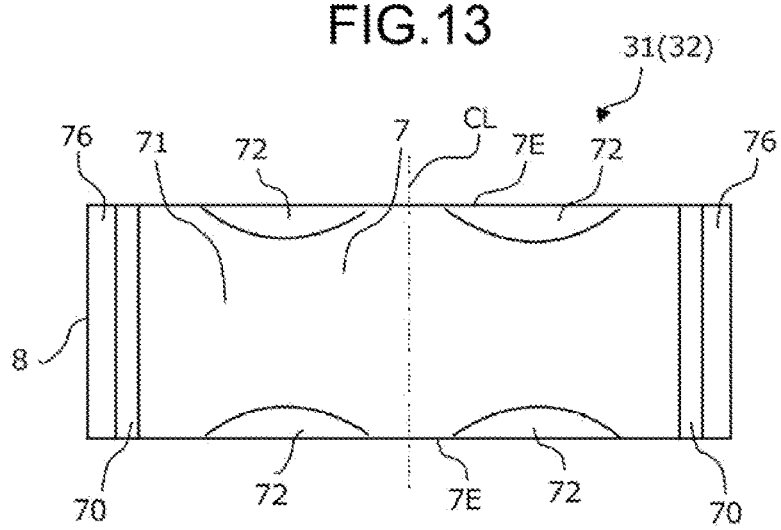
FIG. 13 is a plan view of a half bearing according to a fifth specific example of the present invention when seen from a sliding surface side.

FIG. 13 illustrates a plan view of the half bearings 31 and 32 according to a fifth specific example of the present invention when seen from the sliding surface side. Two inclined surface portions 72 with a shorter length in the circumferential direction than the length of the sliding surface 7 in the circumferential direction are formed at the end portions of the sliding surface of the half bearings 31 and 32 in the axial line direction. FIG. 13 also provides illustration from which the circumferential-direction grooves 73 are omitted. The other configurations are the same as the configurations of the half bearings 31 and 32 that have already been described above.

Three or more inclined surface portions 72 may be provided at end portions of the sliding surface of the half bearings 31 and 32 in the axial line direction.

Sixth Specific Example

Figure 14:
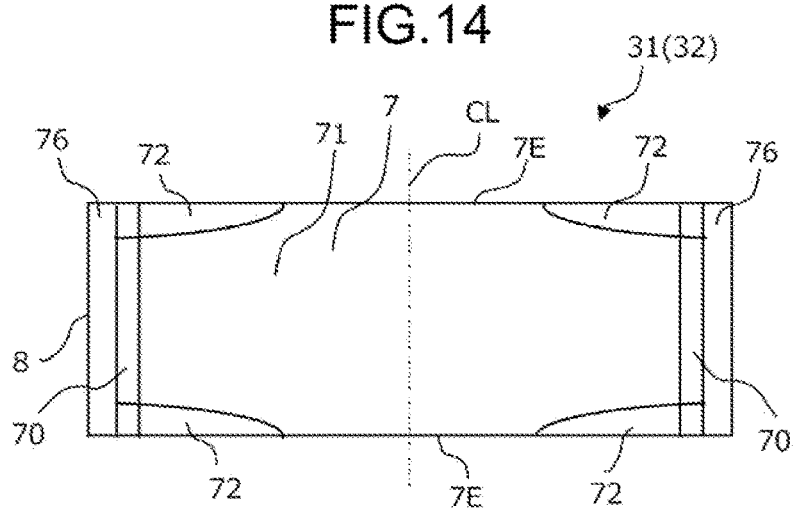
FIG. 14 is a plan view of a half bearing according to a sixth specific example of the present invention when seen from a sliding surface side.

FIG. 14 illustrates a plan view of the half bearings 31 and 32 according to a sixth specific example of the present invention when seen from the sliding surface side. Two inclined surface portions 72 with a shorter length in the circumferential direction than the length of the sliding surface 7 in the circumferential direction are formed at the end portions of the sliding surface of the half bearings 31 and 32 in the axial line direction. FIG. 14 also provides illustration from which the circumferential-direction grooves 73 are omitted. The other configurations are the same as the configurations of the half bearings 31 and 32 that have already been described.

The inclined surface portion 72 has a maximum width L1 of the inclined surface portion 72 at circumferential-direction end portions of the surfaces of the crash reliefs 70 on the side of the circumferential-direction end surfaces 76 of the half bearings 31 and 32 and successively decreases in size toward the side of the circumferential-direction center CL of the half bearings 31 and 32. The inclined surface portion 72 has the maximum depth at the circumferential-direction end portions of the surfaces of the crash reliefs 70 on the side of the circumferential-direction end surfaces 76 of the half bearings 31 and 32, and the depth of the inclined surface portion 72 successively decreases toward the circumferential-direction center CL side of the half bearings 31 and 32.

The half bearing according to the present invention may be chamfered at both end portions of the sliding surface in the axial line direction. The chamfering is performed such that the angle formed between the chamfered surface and the surface of the plane portion 71 of the sliding surface 7 is equal to or greater than 25° (typically 45°). The chamfering is distinguished from the inclined surface portion 72 by the surface with no circumferential-direction groove formed therein.

Although the example in which the half bearing according to the present invention is applied to the conrod bearing that pivotally supports the crank pin of the crankshaft of the internal combustion engine has been illustrated in the above description, the half bearing according to the present invention can be applied to one of or both a pair of half bearings constituting a bearing such as a main bearing that pivotally supports a journal portion of a crankshaft, a bearing that pivotally supports a shaft member of a link mechanism unit of a variable compression ratio device of an internal combustion engine, or a bearing that pivotally supports a shaft member of a balancer device. Also, the half bearing may have an oil hole or an oil groove.

The invention claimed is:

1. A half bearing, when two half bearings are combined, constitutes a sliding bearing with a cylindrical shape, the half bearing comprising:
   a semi-cylindrical shape and has a back surface on an outer circumferential surface side and a sliding surface on an inner circumferential surface side;
   a plurality of circumferential-direction grooves are formed to be adjacent to each other in the sliding surface, the plurality of circumferential-direction grooves being formed over an entire length of the sliding surface in a circumferential direction, the plurality of circumferential-direction grooves being formed over an entire width of the sliding surface, the circumferential-direction grooves including curved recessed surfaces in cross-section in an axial direction, apex portions being formed between the recessed surfaces of the adjacent circumferential-direction grooves, a line connecting the apex portions representing the sliding surface;
   the sliding surface includes a plane portion that is parallel to the axial direction and an inclined surface portion that is adjacent to the plane portion, the inclined surface portion being located at one of or both end portions of the sliding surface in the axial direction, the inclined surface portion being displaced from the plane portion toward the end portion of the sliding surface in the axial direction such that the sliding surface successively comes closer to the back surface; and the inclined surface portion is formed over at least a part of the length of the sliding surface in the circumferential direction, wherein a groove width of the circumferential-direction grooves is defined as a length of imaginary straight lines linearly connecting the apex portions on both sides of the circumferential-direction grooves, groove center lines are defined as lines that pass through center positions of the lengths of the imaginary straight lines and extend in a normal direction with respect to the imaginary straight lines, a groove depth of the circumferential-direction grooves is defined as a length to positions where the recessed surfaces are most separated from the imaginary straight lines in the normal direction with respect to the imaginary straight lines, the positions of maximum groove depths of the circumferential-direction grooves are located on the groove center lines, areas surrounded by the imaginary straight lines and the recessed surfaces are defined as groove sectional areas, each of the plurality of circumferential-direction grooves has the same groove width, the same groove depth, and the same groove sectional area, and the groove width, the groove depth, and the groove sectional area of the circumferential-direction grooves are the same at any position in the circumferential direction, an angle formed by a vertical line extending in the vertical direction from the plane portion of the sliding surface toward an axial line of the half bearing and the groove center lines is defined as a groove inclination angle, and the groove inclination angle in the plane portion of the sliding surface is 0°, and the groove center lines in the inclined surface portion of the sliding surface are inclined relative to the vertical line toward the end portion of the sliding surface in the axial direction, the groove inclination angle of the circumferential-direction groove that is the closest to the plane portion is a minimum angle, and the groove inclination angle successively increases toward the end portion of the sliding surface in the axial direction.

2. The half bearing according to claim 1, wherein when the inclined surface portions are located at both end portions in the axial direction, the inclined surface portions are formed symmetrically with respect to a center of the sliding surface in a width direction.

3. The half bearing according to claim 1, wherein a maximum width of the inclined surface portion is a length corresponding to 2 to 10% of a width of the sliding surface.

4. The half bearing according to claim 1, wherein at a position where the inclined surface portion has a maximum width, a depth of the inclined surface portion is 2 to 10 μm, and here, the depth of the inclined surface portion is a difference between a wall thickness of the plane portion and a wall thickness of the inclined surface portion at the end portion of the sliding surface in the axial direction.

5. The half bearing according to claim 1, wherein the inclined surface portion has a maximum width and a maximum depth at a center portion of a length of the half bearing in the circumferential direction, and here, the depth of the inclined surface portion is a difference between a wall thickness of the plane portion and a wall thickness of the inclined surface portion at the end portion of the sliding surface in the axial direction, and the width and the depth of the inclined surface portion successively decrease toward both end portions of the length of the half bearing in the circumferential direction.

6. The half bearing according to claim 5, wherein the inclined surface portion has a parallel portion with a constant length in the axial direction at a position including the center portion of the length of the half bearing in the circumferential direction.

7. The half bearing according to claim 1, wherein the groove depth of the circumferential-direction grooves is 1.5 to 10 μm.

8. The half bearing according to claim 1, wherein the groove width of the circumferential-direction grooves is 0.05 to 0.25 mm.

9. The half bearing according to claim 1, wherein the groove inclination angle of the circumferential-direction groove in the inclined surface portion that is the closest to the end portion of the sliding surface in the axial direction is $3 \times 10^{-2 \circ}$ to $30 \times 10^{-2 \circ}$ at a position where the inclined surface portion has a maximum width.

10. The half bearing according to claim 1, wherein the half bearing includes two crash reliefs formed on an inner circumferential surface side to be adjacent to both end portions of a length of the half bearing in the circumferential direction.

11. A sliding bearing with a cylindrical shape that pivotally supports a shaft member of an internal combustion engine, the sliding bearing comprising:

the half bearing according to claim 1.

12. The sliding bearing according to claim 11, wherein the sliding bearing is constituted by combining a pair of the half bearings.

* * * * *